(12) United States Patent
Webb

(10) Patent No.: US 10,309,577 B1
(45) Date of Patent: Jun. 4, 2019

(54) SWITCH ARM FOR PIGGABLE PIPELINE CONNECTOR

(71) Applicant: Brian Webb, Owasso, OK (US)

(72) Inventor: Brian Webb, Owasso, OK (US)

( * ) Notice: Subject to any disclaimer, the term of this patent is extended or adjusted under 35 U.S.C. 154(b) by 704 days.

(21) Appl. No.: 14/979,136

(22) Filed: Dec. 22, 2015

(51) Int. Cl.
*F16L 55/00* (2006.01)
*F16L 55/26* (2006.01)
*F16L 41/02* (2006.01)

(52) U.S. Cl.
CPC .............. *F16L 55/26* (2013.01); *F16L 41/023* (2013.01); *F16L 55/00* (2013.01)

(58) Field of Classification Search
CPC .......... F16L 55/26; F16L 55/00; F16L 41/023
See application file for complete search history.

(56) References Cited

U.S. PATENT DOCUMENTS

| | | | | |
|---|---|---|---|---|
| 2,035,747 A * | 3/1936 | Harris | ................... | F16K 11/052 137/625.44 |
| 3,319,650 A * | 5/1967 | Peterson | ................ | B65G 53/56 137/561 R |
| 3,384,421 A * | 5/1968 | Flatt | ....................... | B65G 53/56 137/625.44 |
| 3,658,293 A * | 4/1972 | Gaebel | ...................... | F16K 1/24 251/228 |
| 3,847,373 A * | 11/1974 | Hagar | ..................... | F16K 1/165 251/213 |
| 4,351,361 A * | 9/1982 | Worley | ................. | F16K 1/2261 137/375 |
| 4,718,457 A * | 1/1988 | Luger | .................... | B65G 53/56 137/875 |
| 7,086,416 B2 * | 8/2006 | Kurian | ................ | F16K 27/0272 137/625.44 |
| 9,471,086 B1 * | 10/2016 | Webb | ........................ | G05G 5/04 |
| 9,897,244 B1 * | 2/2018 | Duvall | .................... | F16L 57/00 |
| 2010/0065140 A1 * | 3/2010 | Joynson | ................ | B65G 51/24 137/625.44 |

FOREIGN PATENT DOCUMENTS

CH            291591 A  *  6/1953  ............ F16L 41/023

* cited by examiner

*Primary Examiner* — David Bochna
*Assistant Examiner* — James A Linford
(74) *Attorney, Agent, or Firm* — Head, Johnson, Kachigian & Wilkinson, PC

(57) ABSTRACT

An extended switch arm for a piggable pipeline connector for directing a pig to a particular pipeline and a method of manufacturing the same. The extended switch arm may comprise a switch arm, an upper plate attached to the top of one end of the switch arm, and a lower plate attached to the bottom of the end of the switch arm and aligned with the upper plate. A switch arm extension may pivotally attach between the upper and lower plates via a pin, allowing the switch arm extension to pivot from side to side relative to the switch arm as the switch arm is moved from one side of the pipeline connector to the other, essentially blocking access by the pig to one pipeline or the other without providing any sharp angles or other surfaces upon which the pig could become caught.

14 Claims, 4 Drawing Sheets

SWITCH ARM FOR PIGGABLE PIPELINE CONNECTOR

CROSS REFERENCE

Not Applicable.

BACKGROUND OF THE INVENTION

Field of the Invention

This invention relates generally to a switch arm for a pipeline connector, and more particularly, but not by way of limitation, to an easily manufactured switch arm and method of manufacturing the same.

Description of the Related Art

Devices known as pigs are often used to perform maintenance and for other purposes within pipelines while the pipelines are in use. Pigs have a difficult time negotiating a sharp bend in a pipeline, such as those that can occur at the junction of more than one pipeline. Thus, to be piggable, pipelines sometimes employ Y-shaped junctions rather than T-shaped junctions, making the change in direction a gradual curve rather than a sharp corner.

A switch arm is often attached at the junction between the two outward bound pipelines to allow a user to direct the pig along whichever pipeline he or she desires. The user may turn an attached handle to angle the switch arm to block off one of the pipelines, allowing the pig to travel along the second pipeline, or may turn the handle the other way to block off the second pipeline, allowing the pig to travel along the first.

Piggable pipeline connectors take on many forms. For example, one of the outbound pipelines may be straight, while another may curve. Alternately, both pipelines may curve in opposite directions, or they may curve away from each other initially before running parallel. Connectors with more than two outgoing pipelines may take on even more configurations. To maintain the gradual curve of the inside pipeline walls that makes the connector piggable, the switch arm must likewise curve, or remain straight, as needed to match the abutting wall. The switch arm may thus fill in the gap in the wall of the pig's path without offering any surfaces upon which the pig may get stuck.

Based on the foregoing, it is desirable to provide a switch arm with a pivotable switch arm extension, allowing the switch arm to follow the curve of the pipeline.

It is further desirable for such the switch arm extension to be easily manufacturable.

SUMMARY OF THE INVENTION

In general, in a first aspect, the invention relates to an extended switch arm comprising a switch arm, an upper plate, a lower plate, and a switch arm extension. The switch arm may be elongate and may have a first end, a second end, a top, and a bottom. The upper plate may have a first end and a second end and the first end of the upper plate may be attached to the top of the second end of the switch arm. The lower plate may have a first end and a second end and the first end of the lower plate may be attached to the bottom of the second end of the switch arm. The lower plate may be aligned with the upper plate. The switch arm extension may be elongate and may have a first end and a second end. The first end of the switch arm extension may be pivotally secured between the second end of the upper plate and the second end of the lower plate. The extended switch arm may further comprise a pin extending through a hole in the second end of the upper plate, a hole in first end of the switch arm extension, and a hole in the second end of the lower plate such that the switch arm extension may pivot on the pin relative to the upper plate and the lower plate.

The first end of the upper plate may be attached to the top of the second end of the switch arm via welding and the first end of the lower plate may be attached to the bottom of the second end of the switch arm via welding. The first end of the switch arm may be pivotally attached to an inside wall of a pipeline at a junction between two legs of the pipeline. The first end of the switch arm may be pivotally attached to a pipeline connector via a handle assembly. The upper plate and the lower plate may each have a generally teardrop-shaped cross section, with the first end rounded and the second end tapering to a point. The second end of the switch arm extension may taper to a point or a rounded point. The first end of the switch arm extension may have one or more surfaces that act as stops to prevent rotation of the switch arm extension past a given orientation relative to the switch arm. The second end of the switch arm may have one or more surfaces corresponding to the one or more surfaces of the switch arm extension.

In a second aspect, the invention relates to a method of manufacturing an extended switch arm, the method comprising: attaching a first end of an upper plate to a top of a second end of a switch arm; attaching a first end of a lower plate to a bottom of the second end of the switch arm such that the lower plate aligns with the upper plate; placing a first end of a switch arm extension between a second end of the upper plate and a second end of the bottom plate; and pivotally securing the switch arm extension to the upper plate and the lower plate.

Pivotally securing the switch arm extension to the upper plate and the lower plate may comprise placing a pin through a hole in the second end of the upper plate, through a hole in the first end of the switch arm extension, and through a hole in the second end of the lower plate. The method may further comprise boring the hole through the second end of the upper plate, the first end of the switch arm extension, and the second end of the lower plate after placing the first end of the switch arm extension between the second end of the upper plate and the second end of the bottom plate and before placing the pin through the holes.

The method may further comprise pivotally attaching the first end of the switch arm to an inside wall of a pipeline and/or attaching the first end of the switch arm to a handle assembly and mounting the handle assembly to a pipeline junction such that the switch arm is located within the pipeline. The pipeline junction may be a junction between a first pipeline and a second pipeline, where the first pipeline and the second pipeline each have an inner diameter, and where mounting the handle assembly to the pipeline junction further comprises mounting the handle assembly such that the switch arm pivots between a first position across the inner diameter of the first pipeline and a second position across the inner diameter of the second pipeline when the handle assembly is turned.

Figure 1:
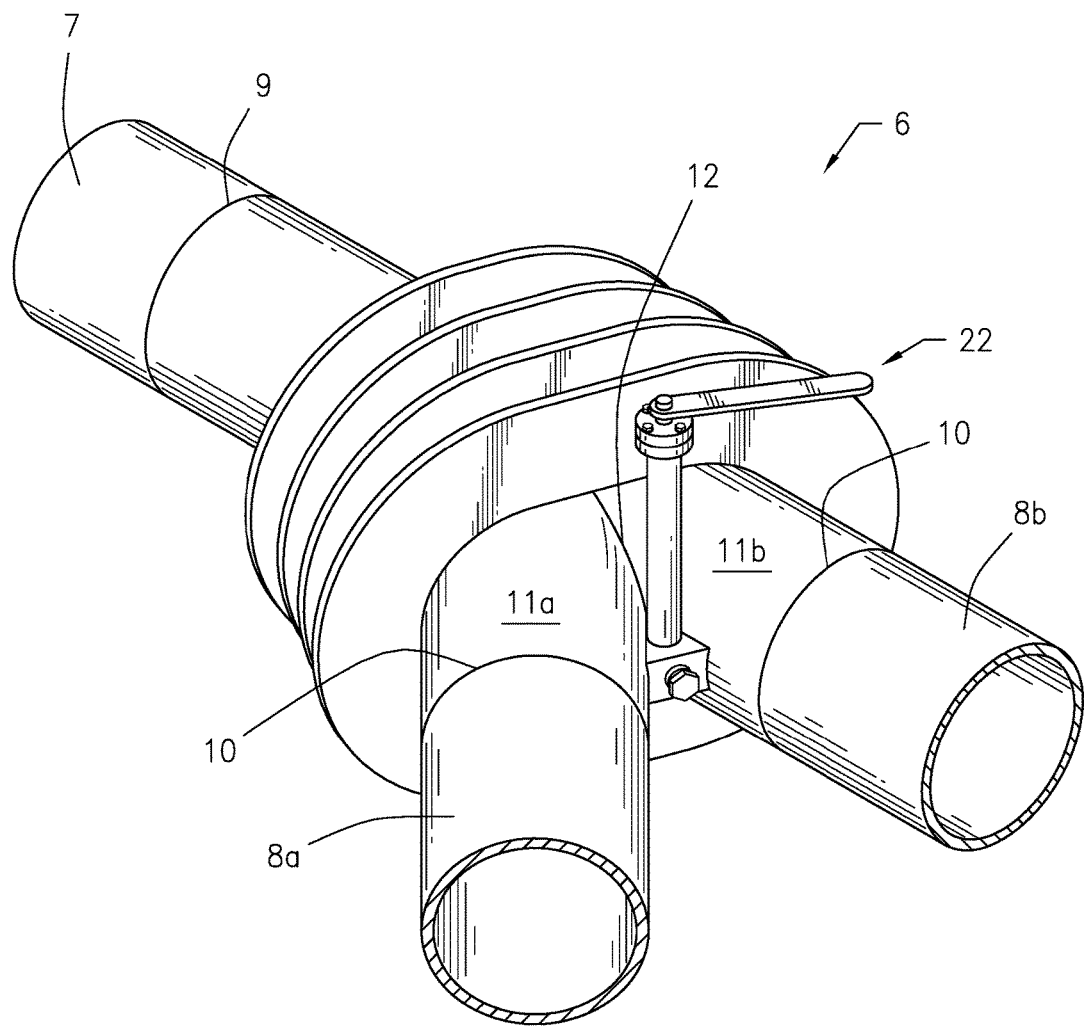
FIG. 1 is a perspective view of the piggable pipeline connector.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a switch arm for a piggable pipeline connector and a method of manufacturing the same. As seen in the drawings, the device may comprise a switch arm 1, a switch arm extension 2, an upper plate 3, a lower plate 4, and a pin 5. The switch arm 1 may be located within a piggable pipeline connector 6, which may connect a single pipeline 7 to a plurality of pipelines 8, such as pipelines 8a and 8b as shown.

The connector 6 may be Y-shaped, as shown in the drawings, or any other shape connector desired. For example, two pipelines 8 may travel perpendicular in opposite directions relative to pipeline 7, one pipeline 8 may travel perpendicularly while another pipeline 8 continues in the same direction as pipeline 7, one or more pipelines 8 may travel at any desired angle relative to pipeline 7, two or more pipelines 8 may each travel at different angles relative to pipeline 7, or any other desired configuration or combination of configurations. In general, the contents may flow from the single pipeline 7 to the plurality of pipelines 8. The switch arm 1 may be used to direct a pig traveling through pipeline 7 into one particular pipeline 8.

The connector 6 may join pipeline 7 at a point 9 and pipelines 8 at points 10. Between points 9 and 10, the connector 6 may branch out from junction 12 into a plurality of legs 11, such as legs 11a and 11b as shown, each leg 11 leading toward one point 10. The connector 6 may be straight or may gradually curve from point 9 to each point 10, making the connector 6 fully piggable. The connector 6 may not have any 90° angles or any other sharp angles that would make passing a pig therethrough difficult or impossible.

The switch arm 1 may be elongate and may have a first end 20 and an opposed second end 21. The first end 20 may be located at junction 12, such that the switch arm 1 may block the entrance to either leg 11, depending on the position of the switch arm 1. The switch arm 1 may be pivotally connected to the connector 6 such that it may pivot between the two legs 11. The switch arm 1 may be connected at its first end 20 to a handle assembly 22, which the user may turn to change the position of the switch arm 1.

The switch arm extension 2 may lie in the same plane as the switch arm 1. It may be pivotally connected to the second end 21 of the switch arm 1 via the plates 3 and 4 and pin 5. The upper plate 3 may be elongate and may have a first end 23 and an opposed second end 24. The lower plate 4 may likewise be elongate and may have a first end 25 and an opposed second end 26. The upper plate 3 and the lower plate 4 may have generally the same shape and dimensions. In particular, the upper plate 3 and the lower plate 4 may each have a teardrop-shaped horizontal cross section, as shown, with first ends 23 and 25 coming to a point and second ends 24 and 26 being generally rounded.

The first end 23 of the upper plate 3 may be attached to the top of the second end 21 of the switch arm 1 and the first end 25 of the lower plate 4 may be attached to the bottom of the second end 21 of the switch arm 1. The upper plate 3 and lower plate 4 may be fixedly attached to the switch arm 1 via welding, by being integrally formed together through casting, or by any other desired method of attachment. The second ends 24 and 26 of the plates 3 and 4 may be generally aligned.

The switch arm extension 2 may be elongate and may have a first end 27 and an opposed second end 28. The first end 27 may fit between the second ends 24 and 26 of the plates 3 and 4. Each of the first end 27 and the second ends 24 and 26 may have a hole 29 therethrough, and all three holes 29 may be generally aligned. The pin 5 may extend through the three holes 29, thus pivotally attaching the switch arm extension 2 to the switch arm 1.

The second end 28 of the switch arm extension 2 may taper to a point or a rounded point, such that the second end 28 is narrower than the first end 27. The first end 27 of the switch arm extension 2 and the second end 21 of the switch arm 1 may be shaped and spaced to limit the rotation of the switch arm extension 2 as desired. For example, as seen in the drawings, second end 21 of the switch arm 1 may have a face 30, which may be flat, as shown. First end 27 of the switch arm extension 2 may have a first face 31 and a second face 32, each of which may be flat and may lie at a different angle. When the switch arm extension 2 rotates to the right, first face 31 may abut face 30 of the switch arm 1, preventing further rotation of the switch arm extension 2 to the right. When the switch arm extension 2 rotates to the left, second face 32 may abut face 30 of the switch arm 1, preventing further rotation of the switch arm extension 2 to the left. The angle at which first face 31 lies may depend on the rate of taper and/or curvature of the right side 33 of the switch arm extension 2 from the first end 27 to the second end 28 and the rate of taper and/or curvature of the right side 34 of the second end 21 of the switch arm 1. Similarly, the angle at which second face 32 lies may depend on the rate of taper and/or curvature of the left side 35 of the switch arm extension 2 from the first end 27 to the second end 28 and the rate of taper and/or curvature of the left side 36 of the second end 21 of the switch arm 1. In both instances, the angle may be such that the side of the switch arm 1 and the side of the switch arm extension 2 form a generally smooth surface with no sharp angles or edges upon which the pig could become stuck. The right side of the switch arm 1 and the right side 33 of the switch arm extension 2 may curve and/or taper appropriately to match the general curvature of the left side of the inside wall of connector 6 as it transitions into the right leg 11 of connector 6. Thus, the left side of the inside wall of connector 6, the right side 33 of the switch arm extension 2, the right side of the switch arm 1, and the left side of the inside wall of the right leg 11 may all form a generally smooth surface with no sharp angles or edges upon which the pig could become stuck. Similarly, the left side of the switch arm 1 and the left side 34 of the switch arm extension 2 may curve and/or taper appropriately to match the general curvature of the right side of the inside wall of connector 6 as it transitions into the left leg 11 of connector 6. Thus, the right side of the inside wall of connector 6, the left side 33 of the switch arm extension 2, the left side of the switch arm 1, and the right side of the inside wall of the left leg 11 may all form a generally smooth surface with no sharp angles or edges upon which the pig could become stuck.

Figure 2:
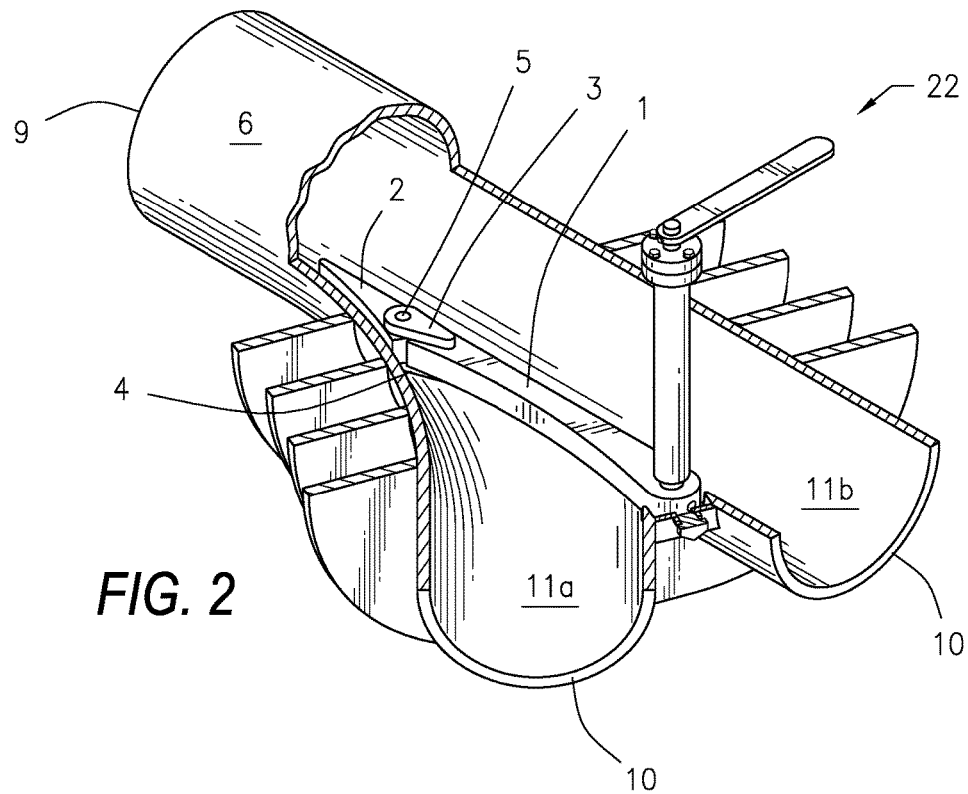
FIG. 2 is a cutaway view of the piggable pipeline connector showing the switch arm in a first position.
Figure 3:
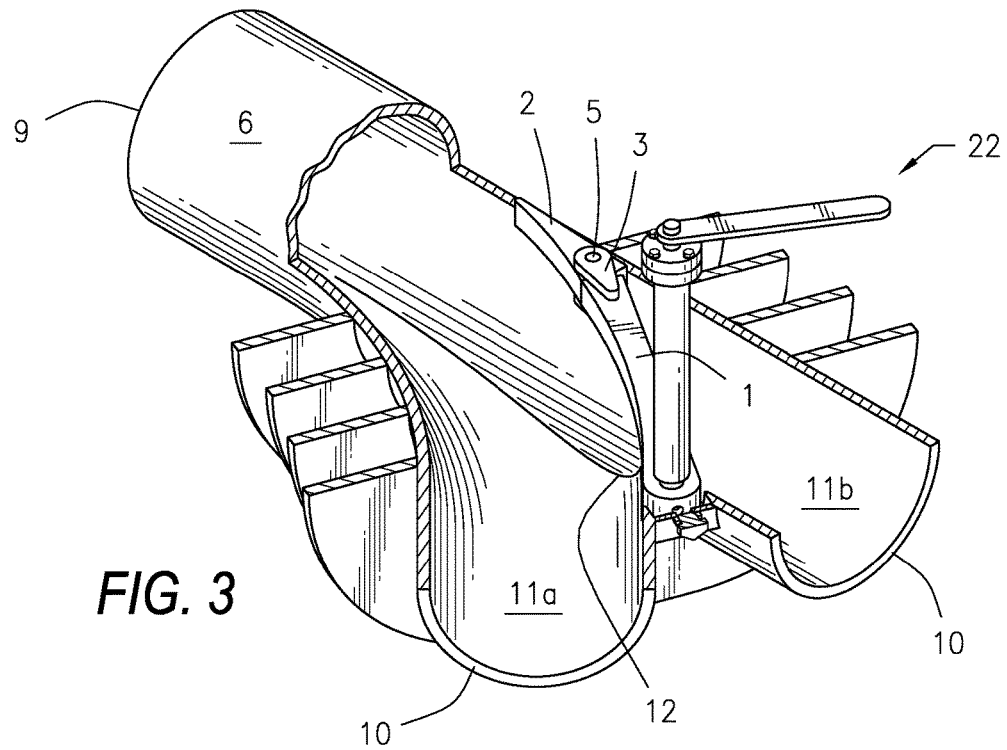
FIG. 3 is a cutaway view of the piggable pipeline connector showing the switch arm in a second position.
Figure 4:
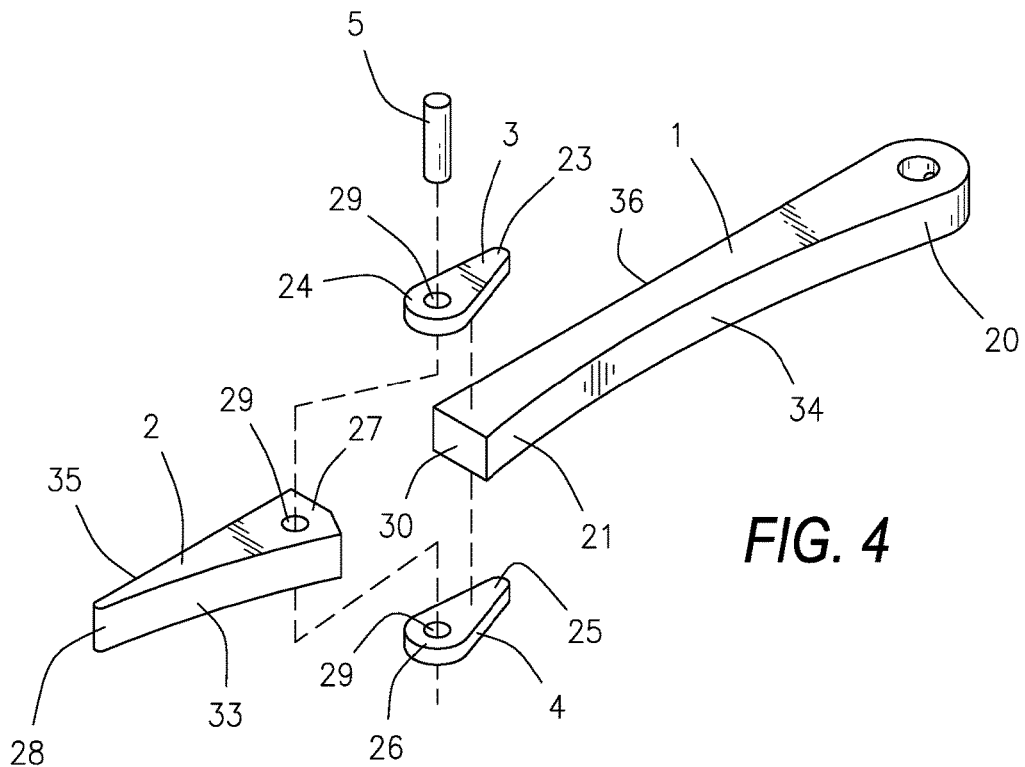
FIG. 4 is an exploded view of the switch arm.
Figure 5:
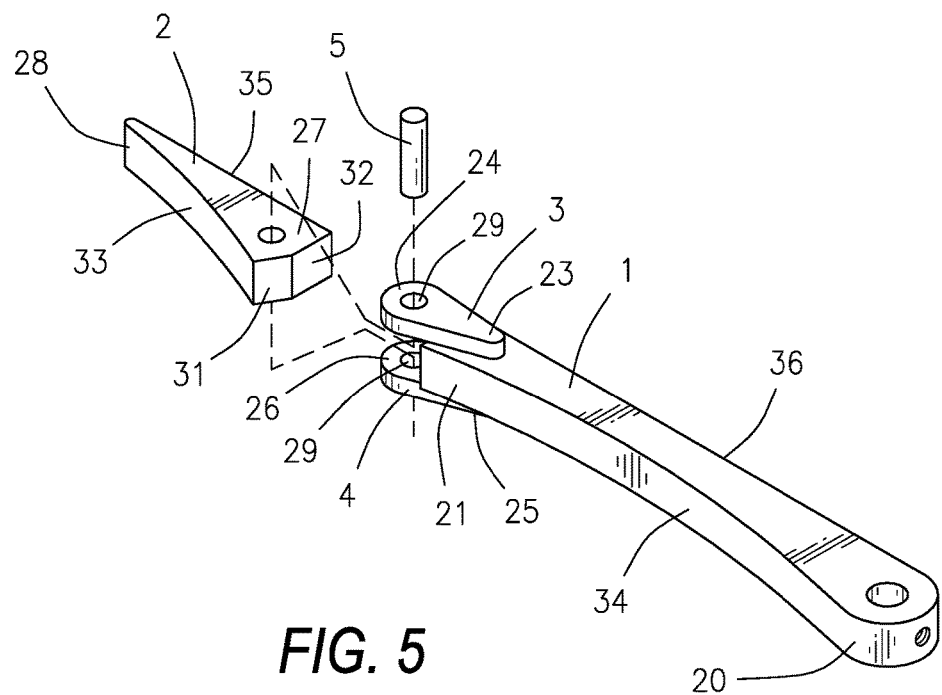
FIG. 5 is an exploded view of the switch arm from a different perspective.
Figure 6:
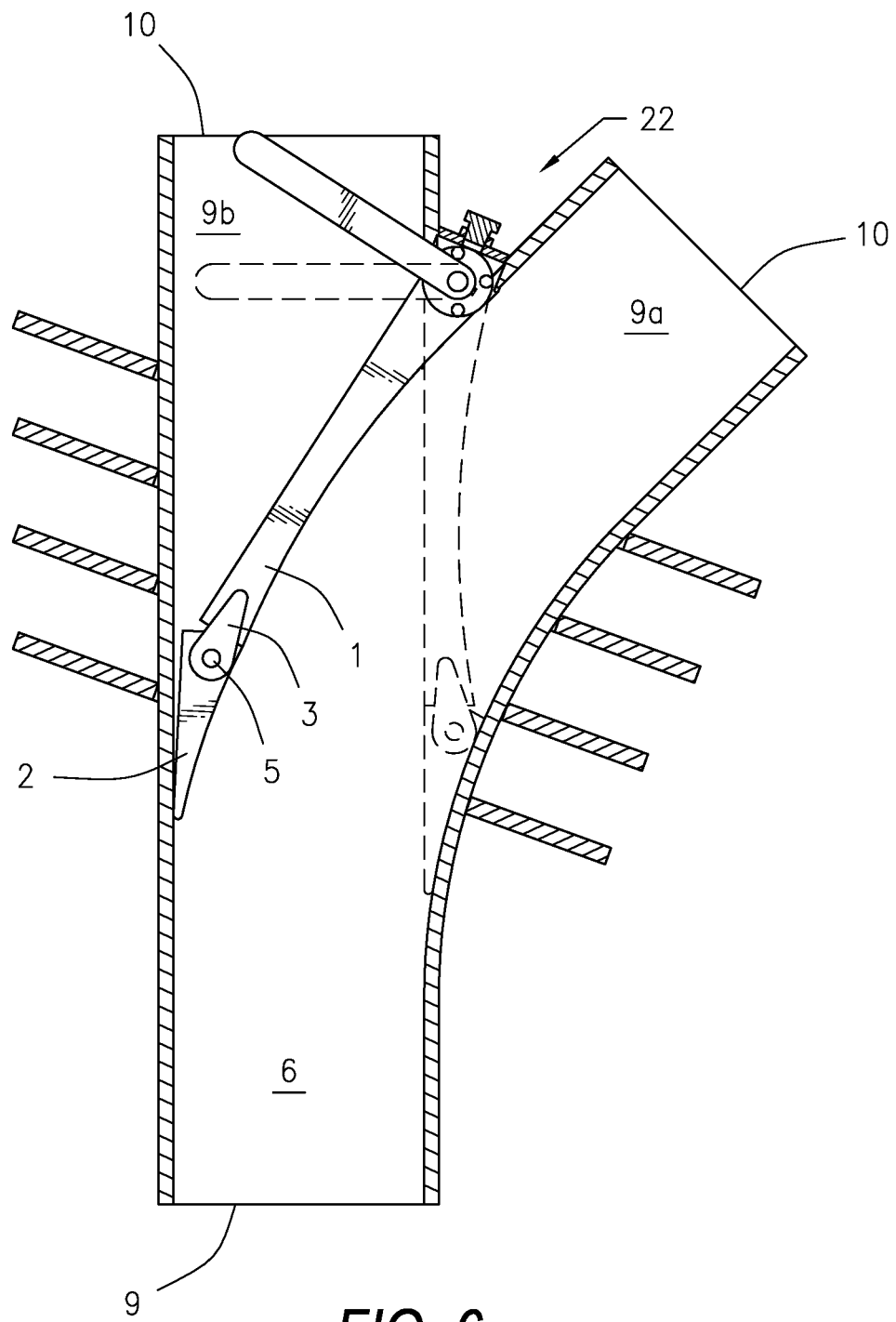
FIG. 6 is a top cutaway view of the piggable pipeline connector showing the switch arm in the second position and showing the first position in dashed lines.

For example, consider a connector 6 with a straight left leg 11, as seen in FIGS. 2, 3, and 6. The left side of the switch arm 1 may be straight, the left side 34 of the switch arm extension 2 may be straight, and the second face 32 of the first end 27 may be at a 90° angle relative to the left side 34. When the switch arm 1 is rotated toward the right, the second end 28 of the switch arm extension 2 may hit the right side of the inside wall of connector 6, causing the switch arm extension 2 to rotate to the left relative to the switch arm 1 until second face 32 of the first end 27 of the switch arm extension 2 hits face 30 of the second end 21 of the switch arm 1. The handle assembly 22 may include a stop to prevent further attempted rotation past this point. As seen in FIGS. 2 and 6, the right side of the inside wall of connector 6, the left side 34 of the switch arm extension 2, the left side of the switch arm 1, and the right side of the inside wall of the left leg 11 may all form a generally smooth surface with no sharp angles or edges upon which the pig could become stuck, allowing the pig to travel smoothly along into the left leg 11 of the connector 6 and on into the left pipeline 8.

Next consider a connector 6 with a curved right leg 11, also as seen in FIGS. 2, 3, and 6. When the switch arm 1 is rotated toward the left, the second end 28 of the switch arm extension 2 may hit the left side of the inside wall of connector 6, causing the switch arm extension 2 to rotate to the right relative to the switch arm 1 until first face 31 of the first end 27 of the switch arm extension 2 hits face 30 of the second end 21 of the switch arm 1. The handle assembly 22 may include a stop to prevent further attempted rotation past this point. The right side of the switch arm 1 may be appropriately curved, the right side 33 of the switch arm extension 2 may be appropriately curved, and the first face 31 of the first end 27 may be at an appropriate angle such that the left side of the inside wall of connector 6, the right side 33 of the switch arm extension 2, the right side of the switch arm 1, and the left side of the inside wall of the right leg 11 may all form a generally smooth surface with no sharp angles or edges upon which the pig could become stuck, allowing the pig to travel smoothly along into the right leg 11 of the connector 6, as seen in FIGS. 3 and 6, and on into the right pipeline 8, as seen in FIG. 1.

The switch arm extension 2 may be of sufficient length that only the second end 28 of the switch arm extension 2 comes into contact with the inside wall of the connector 6, rather than any other part of the switch arm extension 2 or the switch arm 1.

The device may be manufactured by machining the switch arm 1 and switch arm extension 2 to have the desired angles and/or curvatures for the shape of the connector 6 in which it will be used. The first end 23 of the upper plate 3 may be placed on top of the second end 21 of the switch arm 1 and welded in place, while the first end 25 of the lower plate 4 may be attached to the bottom of the second end 21 of the switch arm 1 and welded in place. The first end 27 of the switch arm extension 2 may be placed between the second ends 24 and 26 of plates 3 and 4. If holes 29 already exist, they may be aligned and pin 5 may be placed through the holes 29 in upper plate 3, switch arm extension 2, and lower plate 4, pivotally securing the switch arm extension 2 to the switch arm 1. If holes 29 do not already exist, they may be bored into the upper plate 3, switch arm extension 2, and lower plate 4, and then pin 5 may be placed through the holes 29 in upper plate 3, switch arm extension 2, and lower plate 4, pivotally securing the switch arm extension 2 to the switch arm 1. The switch arm 1 may then be attached to the handle assembly 22 within the connector 6 for use.

Whereas, the devices and methods have been described in relation to the drawings and claims, it should be understood that other and further modifications, apart from those shown or suggested herein, may be made within the spirit and scope of this invention.

What is claimed is:

1. An extended switch arm comprising:
a switch arm, where the switch arm is elongate and has a first end, a second end, a first side, a second side, a top, and a bottom;
an upper plate, where the upper plate has a first end and a second end and where the first end of the upper plate is attached to the top of the second end of the switch arm;
a lower plate, where the lower plate has a first end and a second end, where the first end of the lower plate is attached to the bottom of the second end of the switch arm, and where the lower plate is aligned with the upper plate; and
a switch arm extension, where the switch arm extension is elongate and has a first end, a second end, a first side, and a second side, where the first end has a first stop surface and a second stop surface and where the first end of the switch arm extension is pivotally secured between the second end of the upper plate and the second end of the lower plate;
where the extended switch arm is capable of moving from a first position to a second position and where:
the first side of the switch arm and the first side of the switch arm extension align when the extended switch arm is in the first position;
the second side of the switch arm and the second side of the switch arm extension align when the extended switch arm is in the second position; and
the first stop surface of the switch arm extension comes into contact with the second end of the switch arm when the extended switch arm is in the first position and the second stop surface of the switch arm extension comes into contact with the second end of the switch arm when the extended switch arm is in the second position such that the second end of the switch arm acts as a stop to prevent rotation of the switch arm extension past a given orientation relative to the switch arm.

2. The extended switch arm of claim 1 further comprising a pin extending through a hole in the second end of the upper plate, a hole in first end of the switch arm extension, and a hole in the second end of the lower plate such that the switch arm extension may pivot on the pin relative to the upper plate and the lower plate.

3. The extended switch arm of claim 1 where the first end of the upper plate is attached to the top of the second end of the switch arm via welding and where the first end of the lower plate is attached to the bottom of the second end of the switch arm via welding.

4. The extended switch arm of claim 1 where the first end of the switch arm is pivotally attached to an inside wall of a pipeline at a junction between two legs of the pipeline.

5. The extended switch arm of claim 1 where the first end of the switch arm is pivotally attached to a pipeline connector via a handle assembly.

6. The extended switch arm of claim 1 where the upper plate and the lower plate each have a teardrop-shaped cross section, with the first end rounded and the second end tapering to a point.

7. The extended switch arm of claim 1 where the second end of the switch arm extension tapers to a point or a rounded point.

8. The extended switch arm of claim 1 where the switch arm, the upper plate, and the lower plate are integrally formed together through casting.

9. A method of manufacturing an extended switch arm, the method comprising:
   attaching a first end of an upper plate to a top of a second end of a switch arm;
   attaching a first end of a lower plate to a bottom of the second end of the switch arm such that the lower plate aligns with the upper plate;
   placing a first end of a switch arm extension between a second end of the upper plate and a second end of the bottom plate; and
   pivotally securing the switch arm extension to the upper plate and the lower plate;
where the extended switch arm is capable of moving from a first position to a second position and where:
   a first side of the switch arm and a first side of the switch arm extension align when the extended switch arm is in the first position;
   a second side of the switch arm and a second side of the switch arm extension align when the extended switch arm is in the second position; and
   a first stop surface of the switch arm extension comes into contact with the second end of the switch arm when the extended switch arm is in the first position and a second stop surface of the switch arm extension comes into contact with the second end of the switch arm when the extended switch arm is in the second position such that the second end of the switch arm acts as a stop to prevent rotation of the switch arm extension past a given orientation relative to the switch arm.

10. The method of claim 9, where pivotally securing the switch arm extension to the upper plate and the lower plate comprises placing a pin through a hole in the second end of the upper plate, through a hole in the first end of the switch arm extension, and through a hole in the second end of the lower plate.

11. The method of claim 10 further comprising boring the hole through the second end of the upper plate, the first end of the switch arm extension, and the second end of the lower plate after placing the first end of the switch arm extension between the second end of the upper plate and the second end of the bottom plate and before placing the pin through the holes.

12. The method of claim 9 further comprising pivotally attaching the first end of the switch arm to an inside wall of a pipeline.

13. The method of claim 9 further comprising attaching the first end of the switch arm to a handle assembly and mounting the handle assembly to a pipeline junction such that the switch arm is located within the pipeline.

14. The method of claim 13 where the pipeline junction is a junction between a first pipeline and a second pipeline, where the first pipeline and the second pipeline each have an inner diameter, and where mounting the handle assembly to the pipeline junction further comprises mounting the handle assembly such that the switch arm pivots between the first position across the inner diameter of the first pipeline and the second position across the inner diameter of the second pipeline when the handle assembly is turned.

* * * * *